US 6,681,318 B2

(12) United States Patent
Chaudhry et al.

(10) Patent No.: US 6,681,318 B2
(45) Date of Patent: Jan. 20, 2004

(54) METHOD AND APPARATUS FOR USING AN ASSIST PROCESSOR TO PREFETCH INSTRUCTIONS FOR A PRIMARY PROCESSOR

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 543 days.

(21) Appl. No.: 09/761,216

(22) Filed: Jan. 16, 2001

(65) Prior Publication Data

US 2002/0095563 A1 Jul. 18, 2002

Related U.S. Application Data

(60) Provisional application No. 60/231,452, filed on Sep. 8, 2000.

(51) Int. Cl.[7] .................................................. G06F 9/38
(52) U.S. Cl. ........................ 712/207; 711/130; 711/137; 712/34; 712/240; 717/106
(58) Field of Search ........................... 712/34, 207, 240; 711/130, 137; 717/106

(56) References Cited

U.S. PATENT DOCUMENTS

| | | | | |
|---|---|---|---|---|
| 4,991,080 A | 2/1991 | Emma et al. | ................ | 712/206 |
| 5,392,391 A | 2/1995 | Caulk, Jr. et al. | ............ | 345/503 |
| 5,787,285 A | 7/1998 | Lanning | ..................... | 717/130 |
| 5,961,631 A | 10/1999 | Devereux et al. | ............ | 712/207 |

FOREIGN PATENT DOCUMENTS

| | | |
|---|---|---|
| WO | WO 96/20440 | 7/1996 |
| WO | WO 00/38050 | 6/2000 |

OTHER PUBLICATIONS

IBM Technical Disclosure Bulletin entitled "Storage Hierarchy Control System," by E. Sakalay, XP 002002415, vol. 15, No. 4, Sep. 1972.
Publication entitled "Code Generation for Streaming: an Access/Execute Mechanism," by Manuel E. Benitez et al., XP 00203256, 8345 Computer Architecture News, Apr. 19, 1991, No. 2, New York, pp. 132–141.

*Primary Examiner*—Kenneth S. Kim
(74) *Attorney, Agent, or Firm*—Park, Vaughan & Fleming LLP

(57) ABSTRACT

One embodiment of the present invention provides a system that prefetches instructions by using an assist processor to perform prefetch operations in advance of a primary processor. The system operates by executing executable code on the primary processor, and simultaneously executing a reduced version of the executable code on the assist processor. This reduced version of the executable code executes more quickly than the executable code, and performs prefetch operations for the primary processor in advance of when the primary processor requires the instructions. The system also stores the prefetched instructions into a cache that is accessible by the primary processor so that the primary processor is able to access the prefetched instructions without having to retrieve the prefetched instructions from a main memory. In one embodiment of the present invention, prior to executing the executable code, the system compiles source code into executable code for the primary processor. Next, the system profiles the executable code to create instruction traces for frequently referenced portions of the executable code. The system then produces the reduced version of the executable code for the assist processor by producing prefetch instructions to prefetch portions of the instruction traces into a cache that is accessible by the primary processor. The system also inserts communication instructions into the executable code for the primary processor and into the reduced version of the executable code for the assist processor to transfer progress information from the primary processor to the assist processor. This progress information triggers the assist processor to perform the prefetch operations.

25 Claims, 6 Drawing Sheets

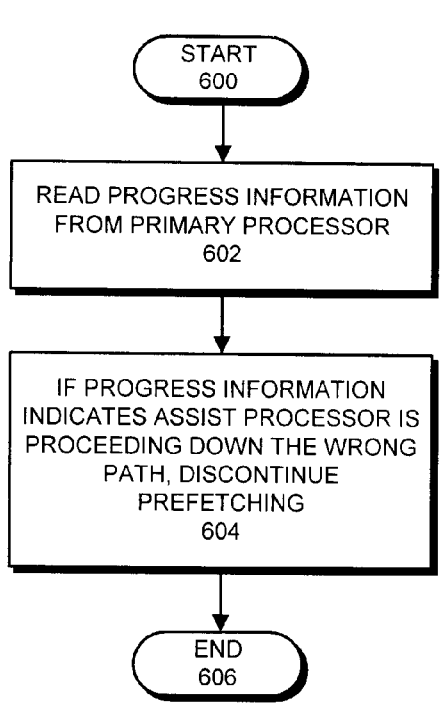
FIG. 6
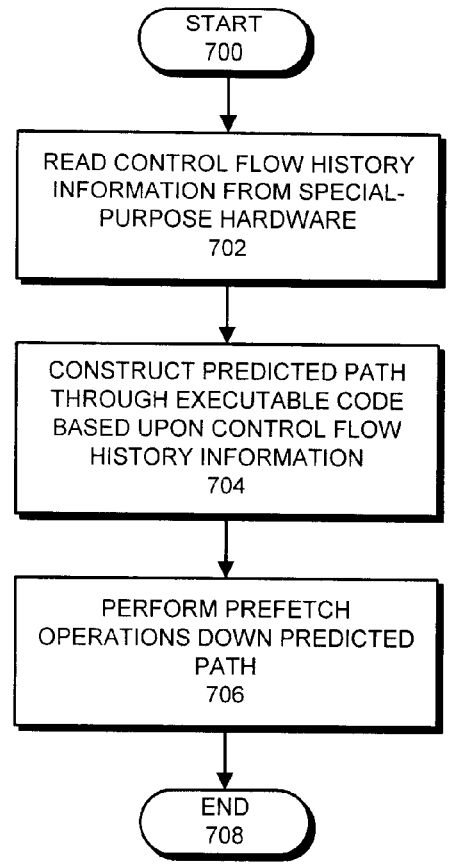
FIG. 7
| CALL ADDRESS | BRANCH HISTORY | | | | |
|---|---|---|---|---|---|
| X | T | NT | T | T | T |
| Y | | | | | |
| Y + 4 | | | | | |
| Z | T | T | NT | | |
SPECIAL-PURPOSE HARDWARE 800
FIG. 8

METHOD AND APPARATUS FOR USING AN ASSIST PROCESSOR TO PREFETCH INSTRUCTIONS FOR A PRIMARY PROCESSOR

RELATED APPLICATION

This application hereby claims priority under 35 U.S.C. § 119 to Provisional Patent Application No. 60/231,452 filed on Sep. 8, 2000.

BACKGROUND

1. Field of the Invention

The present invention relates to techniques for improving computer system performance. More specifically, the present invention relates to a method and an apparatus for prefetching instructions from memory by using an assist processor to perform prefetch operations in advance of a primary processor.

2. Related Art

As increasing semiconductor integration densities allow more transistors to be integrated onto a microprocessor chip, computer designers are investigating different methods of using these transistors to increase computer system performance. To this end, computer designers are beginning to incorporate multiple central processing units (CPUs) into a single semiconductor chip. This can result in performance gains for computational tasks that can be parallelized (divided) into separate pieces that can be concurrently executed.

Unfortunately, performance gains from parallelization can be limited for many applications that contain inherently serial portions of code. For these inherently serial portions of code, performance is further limited by memory latency problems.

Memory latency problems are growing progressively worse as processor clock speeds continue to improve at an exponential rate. At today's processor clock speeds, it can take as many as 200 processor clock cycles to pull a cache line in from main memory.

Computer designers presently use a number of techniques to decrease memory latency delays. (1) Out-of-order execution can be used to schedule loads and stores so that memory latency is hidden as much as possible. Unfortunately, out-of-order execution is typically limited to hiding a few clock cycles of memory latency. (2) A non-faulting load instruction can be used to speculatively load a data value without causing a fault when the address is not valid. (3) A steering load instruction can be used to speculatively load a data value into L2 cache, but not L1 cache, so that L1 cache is not polluted by unused data values. Unfortunately, using non-faulting loads and steering loads can result in unnecessary loads. This wastes instruction cache space and ties up registers. (4) Some researchers have investigated using hardware prefetch engines, but these hardware prefetch engines are typically ineffective for irregular memory access patterns.

Memory latency delays can also be a problem during instruction fetch operations. Note that an instruction cache miss can cause as much of a delay as a data cache miss. Also note that it is very hard to predict which instructions are likely to be executed next because of the numerous branches and function calls that are commonly interspersed into program code written in modern programming languages.

What is needed is a method and an apparatus that reduces memory latency delays during instruction fetch operations.

SUMMARY

One embodiment of the present invention provides a system that prefetches instructions by using an assist processor to perform prefetch operations in advance of a primary processor. The system operates by executing executable code on the primary processor, and simultaneously executing a reduced version of the executable code on the assist processor. This reduced version of the executable code executes more quickly than the executable code, and performs prefetch operations for the primary processor in advance of when the primary processor requires the instructions. The system also stores the prefetched instructions into a cache that is accessible by the primary processor so that the primary processor is able to access the prefetched instructions without having to retrieve the prefetched instructions from a main memory.

In one embodiment of the present invention, prior to executing the executable code, the system compiles source code into executable code for the primary processor. Next, the system profiles the executable code to create instruction traces for frequently referenced portions of the executable code. The system then produces the reduced version of the executable code for the assist processor by producing prefetch instructions to prefetch portions of the instruction traces into a cache that is accessible by the primary processor. The system also inserts communication instructions into the executable code for the primary processor and into the reduced version of the executable code for the assist processor to transfer progress information from the primary processor to the assist processor. This progress information triggers the assist processor to perform the prefetch operations.

In one embodiment of the present invention, the process of compiling the source code and the process of producing the reduced version of the executable code are carried out by a compiler.

In one embodiment of the present invention, if the progress information indicates to the assist processor that the assist processor has prefetched instructions down the wrong path, the reduced version of the executable code causes the assist processor to discontinue prefetching.

In one embodiment of the present invention, the reduced version of the executable code is configured to read control flow history information from special-purpose hardware that records branch history information and call history information. Next, the reduced version of the executable code constructs a predicted path through the executable code based on the control flow history information, and then performs prefetch operations down the predicted path in order to prefetch instructions for the primary processor.

In one embodiment of the present invention, producing the reduced version of the executable code involves constructing a control flow graph for the executable code. In doing so, the system removes loops from the control flow graph, and removes executable code instructions unrelated to the control flow graph. The system also inserts the prefetch instructions into the reduced version of the executable code to prefetch instructions from the executable code for the primary processor.

In one embodiment of the present invention, performing the prefetch operations involves prefetching cache blocks containing multiple instructions for the primary processor.

In one embodiment of the present invention, the system periodically sends the progress information from the primary processor to the assist processor through a one-way communication channel.

In one embodiment of the present invention, the primary processor and the assist processor reside on the same semiconductor chip.

In one embodiment of the present invention, the primary processor and the assist processor reside on distinct semiconductor chips.

In one embodiment of the present invention, the assist processor is a simplified version of the primary processor.

BRIEF DESCRIPTION OF THE FIGURES

FIG. 6 is a flow chart illustrating how the reduced version of the executable code bails out when it determines that it has proceeded down the wrong path in accordance with an embodiment of the present invention.

FIG. 7 is a flow chart illustrating how the reduced version of the executable code operates by reading control flow history information from special-purpose hardware in accordance with an embodiment of the present invention.

FIG. 8 illustrates special-purpose hardware for storing control flow history information in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
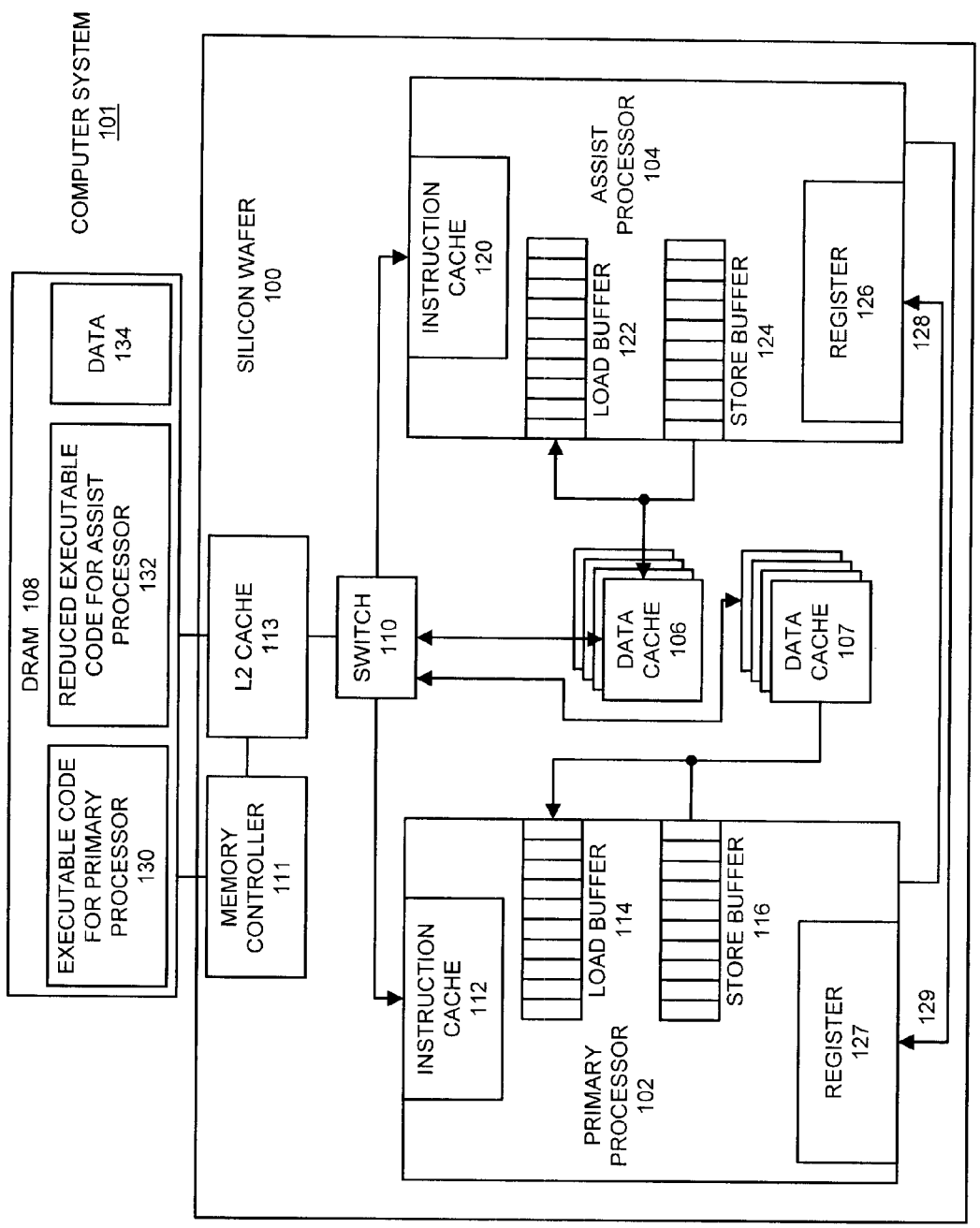
FIG. 1 illustrates a computer system in accordance with an embodiment of the present invention.

FIG. 1 illustrates a computer system 101 in accordance with an embodiment of the present invention. Computer system 101 includes a primary processor 102 and an assist processor 104. All of these structures reside on silicon die 100 (although in other embodiments of the present invention they can reside on multiple silicon dies).

Processors 102 and 104 include instruction caches 112 and 120, respectively, which contain instructions to be executed by processors 102 and 104.

Processors 102 and 104 additionally include load buffers 114 and 122 as well as store buffers 116 and 124 for buffering communications with data caches 107 and 106, respectively. More specifically, primary processor 102 includes load buffer 114 for buffering loads received from data cache 107, and store buffer 116 for buffering stores to data cache 107. Similarly, assist processor 104 includes load buffer 122 for buffering loads received from data cache 106, and store buffer 124 for buffering stores to data cache 106.

Processors 102 and 104 are additionally coupled together by one-way communication channels 128–129, which facilitates rapid communication between primary processor 102 and assist processor 104. Note that communication channel 128 allows primary processor 102 to write into register 126 within assist processor 104. Similarly, communication channel 129 allows assist processor 104 to write into register 127 within primary processor 102.

Unlike using shared memory communication mechanisms, writing into register 126 (or 127) will not cause a cache miss or coherence traffic. Furthermore, primary processor 102 does not have to wait until assist processor 104 receives the communication to continue processing. In contrast, if primary processor 102 were to communicate with assist processor 104 through memory, the system would have to wait for store buffer 116 to be cleared in order to communicate.

In one embodiment of the present invention, data caches 106 and 107 are 16K-byte 4-way set-associative data caches with 32-byte cache lines.

Data cache 106, data cache 107, instruction cache 112 and instruction cache 120 are coupled through switch 110 to L2 cache 113. Switch 110 may include any type of circuitry for switching signal lines. In one embodiment of the present invention, switch 110 is a cross bar switch.

L2 cache is a large unified cache for storing both instructions and data for primary processor 102 and assist processor 104. L2 cache 113 is coupled to memory controller 111, which is itself coupled to dynamic random access memory (DRAM) 108 (located off chip).

DRAM 108 contains executable code 130 for primary processor 102. During system operation, executable code 130 is loaded through memory controller 111, L2 cache 113 and switch 110 into instruction cache 112 of primary processor 102. DRAM 108 also contains reduced executable code 132 for assist processor 104. Reduced executable code 132 is a reduced version of executable code 130 that generates the same pattern of memory references as executable code 130. During system operation, reduced executable code 132 is loaded through memory controller 111, L2 cache 113 and switch 110 into instruction cache 120 of assist processor 104. DRAM 108 additionally contains data 134 that is moved to and from data caches 106–107 through memory controller 111, L2 cache 113 and switch 110.

Note that the present invention can be used in any computer system that includes multiple processors, and is not limited to the illustrated computer system structure.

Also note that in one embodiment of the present invention, assist processor 104 is used to make instruction accesses in advance of when the instructions are used by primary processor 102. In this embodiment, assist processor 104 does not have to actually perform all of the computations specified in a program; assist processor 104 merely has to perform sufficient computations to allow assist processor 104 to determine the instruction access pattern of the program. Hence, assist processor 104 can be a much simpler version of primary processor 102, excluding circuitry that is not required to perform instruction address computations (e.g., dividers and multiplier circuits).

Compilation Process

Figure 2:
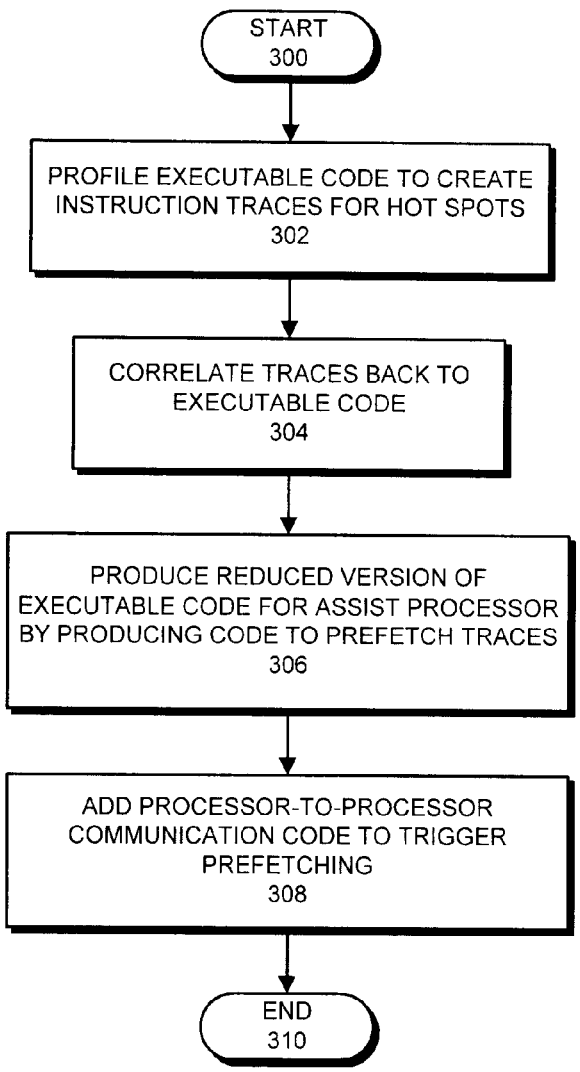
FIG. 2 illustrates the compilation process in accordance with an embodiment of the present invention.

FIG. 2 illustrates the compilation process in accordance with an embodiment of the present invention. During the compilation process, source code 202 feeds through compiler 204 to produce executable code 130 for primary processor 102. Executable code 130 then feeds through reduction module 208 to produce reduced executable code 132 for assist processor 104. Note that reduction module 208 may be part of compiler 204, or alternatively, may be separate from compiler 204.

In one embodiment of the present invention, the compilation and reduction processes take place before run-time. In another embodiment, the compilation and reduction processes take place during run-time, while the program is executing.

Generating Reduced Executable Code

Figure 3:
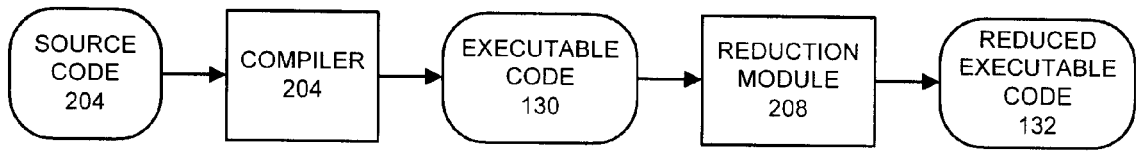
FIG. 3 is a flow chart illustrating the process of generating the reduced version of the executable code in accordance with an embodiment of the present invention.

FIG. 3 is a flow chart illustrating the process of generating reduced executable code 132 within reduction module 208 in accordance with an embodiment of the present invention. The system starts by profiling (simulating execution of) executable code 130 to identify hot spots in which memory latency is causing delays (step 302). The system uses information gained during the profiling process to build instruction traces of the hot spots in executable code 130. In one embodiment of the present invention, the system constructs about 100 dispersed traces of about 2000 instructions each. The system then correlates these traces back to the corresponding source code (step 304).

Next, the system creates reduced executable code 132 by producing code to prefetch the traces (step 306). This process is described in more detail below with reference to FIGS. 4, 5 and 9.

The system also inserts processor-to-processor communication code into both executable code 130 and reduced executable code 132 (step 308). This communication code causes primary processor 102 to communicate progress information to assist processor 104. This progress information enables assist processor 104 to determine whether it is prefetching down the correct path and whether it is too far in advance of primary processor 102 to continue prefetching.

Note that it is undesirable for assist processor 104 to prefetch instructions too far in advance of primary processor 102, because instructions that are prefetched far in advance are less likely to be used by the primary processor 102, and may replace data needed more immediately by primary processor 102. Prefetching instructions that are less likely to be used can tie up memory bandwidth and can lead to cache pollution, which reduces computer system performance. Hence, it is desirable for assist processor 104 to wait until the execution path of primary processor 102 is close to the corresponding code in assist processor 104 before initiating prefetch instructions.

Also note that a single prefetch operation typically retrieves an entire cache line containing multiple instructions. For example, a prefetched cache line may include 64 bytes that contain 16 4-byte instructions.

If this progress information indicates that assist processor 104 is prefetching down the wrong path through executable code 130, the system can cause assist processor 104 to bail out of prefetching the instruction trace.

Figure 4:
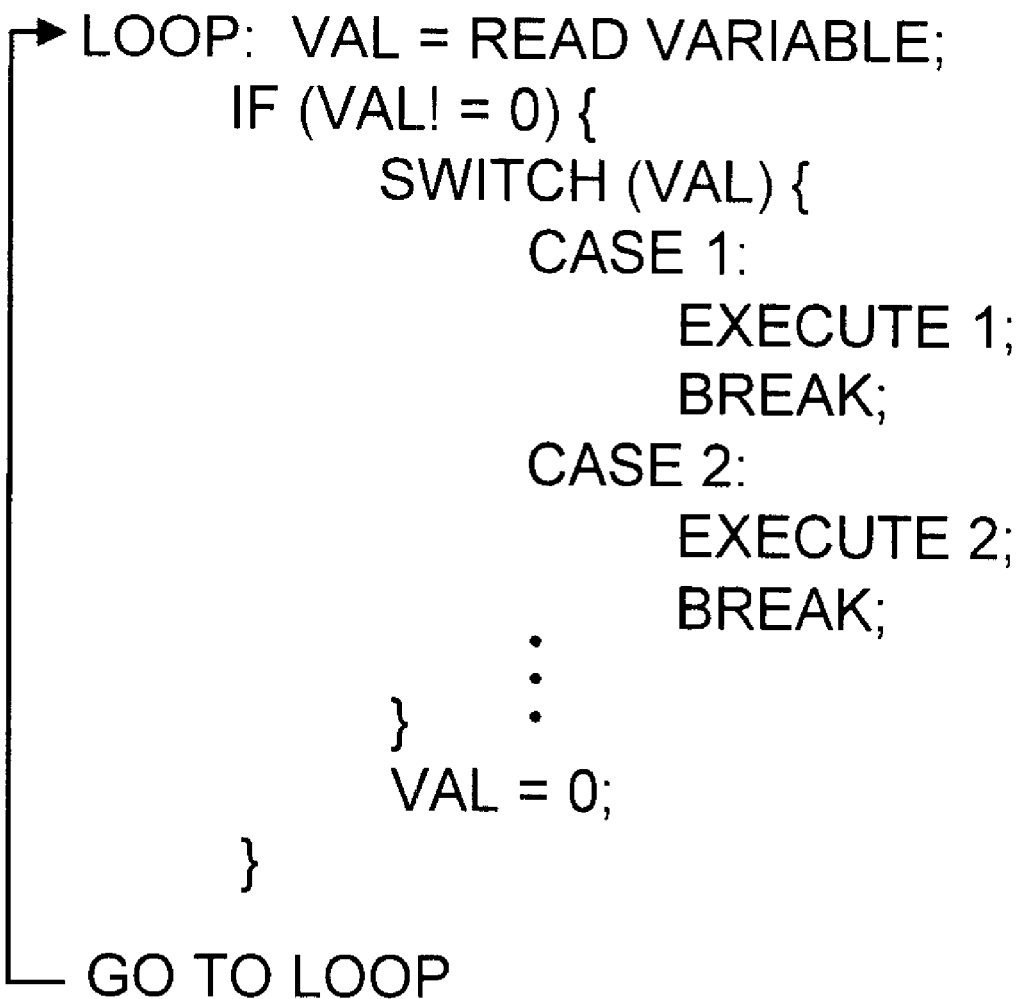
FIG. 4 illustrates an example structure for the reduced executable code in accordance with an embodiment of the present invention.

FIG. 4 illustrates one possible structure for reduced executable code 132 in accordance with an embodiment of the present invention. In this embodiment, reduced executable code 132 is structured as a loop. The code first starts by reading a variable "val", which can be located in a shared memory or within register 126 in FIG. 1. If the val does not equal zero, the system executes a switch statement that executes specific pieces of code containing prefetch operations based upon the value contained in val. In this way, primary processor 102 can communicate progress information to assist processor 104 through the variable val. This progress information causes specific prefetch instructions to be executed so that assist processor 104 prefetches instructions in advance of when primary processor 102 requires the instructions. The code then resets val to zero and continues with the loop. Note that reads and writes to val are not synchronized.

Figure 5:
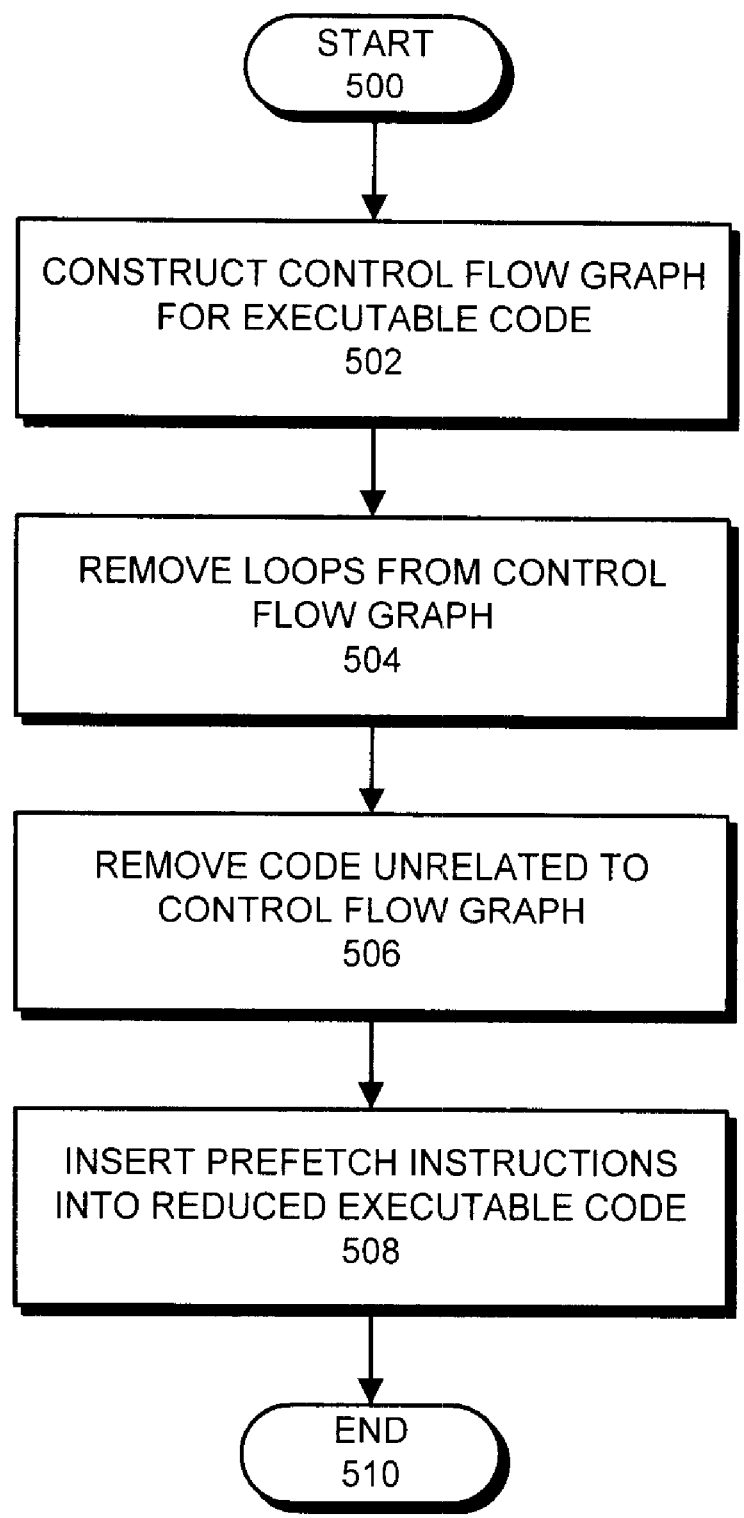
FIG. 5 is a flow chart illustrating details of how to construct the reduced version of the executable code in accordance with an embodiment of the present invention.

FIG. 5 is a flow chart illustrating details of how to construct the reduced executable code 132 in accordance with an embodiment of the present invention. The system starts by constructing a control flow graph for executable code 130 (step 502). Next, the system removes small loops from the control flow graph (step 504) because small loops are presumed to be prefetched into L2 cache 113. Hence, once a small loop is prefetched, it executes until the loop is finished. The system also removes all instructions from executable code 130 that are unrelated to the control flow graph (step 506). This can be done because the unrelated code will not affect the execution path through the code, and hence will have no influence on the required prefetch operations. For example, deterministic code that performs mathematical computations can be removed.

Next, the system inserts prefetch instructions into reduced executable code 132 to prefetch instructions for corresponding sections of executable code 130 (step 508).

Bail Out Process

FIG. 6 is a flow chart illustrating how reduced executable code 132 bails out when it determines that it has proceeded down the wrong path in accordance with an embodiment of the present invention. The system starts when reduced executable code 132 executing on assist processor 104 reads progress information that was written by primary processor 102 (step 602). This progress information indicates where the execution path of primary processor 102 has gone within executable code 130.

If this progress information indicates that assist processor 104 is proceeding down the wrong path, assist processor 104 discontinues prefetching the trace (step 604). Assist processor may optionally start prefetching for the correct path.

Note that during the prefetching process, assist processor 104 may decide to prefetch only down one side of a branch, and primary processor 102 may actually decide to go down the other side of the branch. In this case, assist processor 104 has taken the wrong path.

Also note that assist processor 104 does not necessarily have to bail out. The only penalty for prefetching down the wrong path is cache pollution and unnecessary memory transfers, which may not be a significant factor for a very small trace.

Special-Purpose Hardware for Storing History Information

FIG. 7 is a flow chart illustrating how reduced executable code 132 operates in accordance with an embodiment of the present invention. The system starts by reading control flow history information from special-purpose hardware that records control flow history information for executable code 130 (step 702). For example, this control flow history information can include a record of which branches are taken and which function calls are executed. Next, the system constructs a predicted path through executable code 130 based upon the control flow history information (step 704). For example, the predicted path can be determined based upon the last path taken through executable code 130, or based upon the most frequently taken path through executable code 130. Next, reduced executable code 132 causes assist processor 104 to perform prefetch operations down the predicted path (step 706).

FIG. 8 illustrates special-purpose hardware for storing control flow history information in accordance with an embodiment of the present invention. In this embodiment, the special-purpose hardware stores call addresses for function calls and returns. For each call, the hardware stores a record of whether successive branches are taken or not taken. For example, the first row specifies a function call residing at address "X" followed by a taken branch, a not taken branch and then three taken branches. The second row specifies a function call residing at address "Y" and then no branches. The third row specifies a return from the function call to address "Y+4". Finally, the fourth row specifies a function call residing at address "Z" followed by a two taken branches and a not taken branch.

Sample Reduced Executable Code

Figure 9:
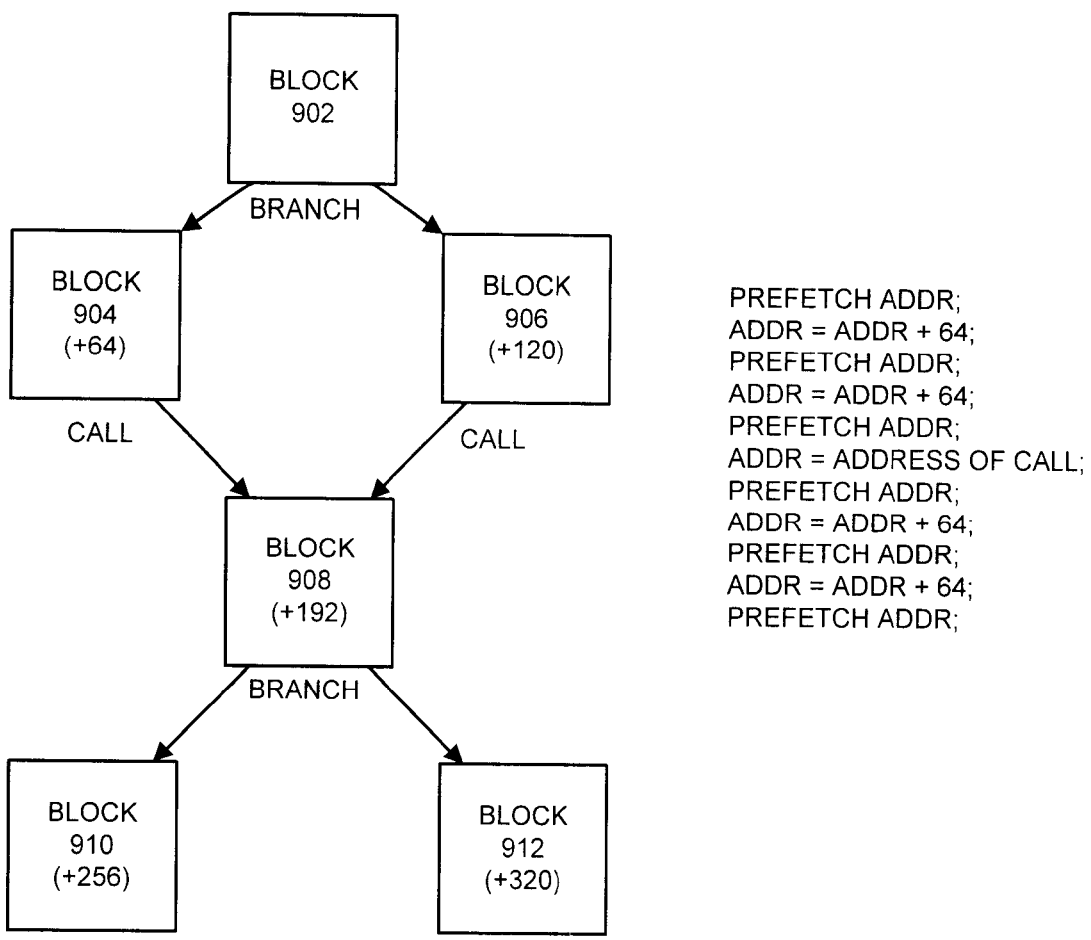
FIG. 9 illustrates a sample portion of reduced executable code in accordance with an embodiment of the present invention.

FIG. 9 illustrates a sample portion of reduced executable code 132 including prefetch instructions in accordance with an embodiment of the present invention.

The left-hand-side of FIG. 9 illustrates the structure of a section of executable code 130. This section is divided into a number of blocks 902, 904, 906, 908, 910 and 912, each of which is 64-bytes long and can be prefetched in a single prefetch operation. Note that executable code 130 first executes block 902, which performs a branch to either block 904 or block 906. Both blocks 904 and 906 perform a function call to block 908. Block 908 then performs a branch to either block 910 or block 912.

The right-hand-side of FIG. 9 illustrates the corresponding structure of a portion of reduced executable code 132. Reduced executable code 132 first prefetches blocks 902, 904 and 906. Next, the variable "addr" is loaded with the target address of the function call, and then reduced executable code 132 prefetches blocks 908, 910 and 912.

Note that reduced executable code 132 prefetches down both sides of the branches in executable code 130. In another embodiment of the present invention, reduced executable code 132 prefetches only down a predicted branch path in order to eliminate unnecessary instruction loads and instruction cache pollution.

Also note that the prefetch operation moves blocks of executable code 130 into L2 cache 113 in FIG. 1. Alternatively, the prefetch operation can cause instructions to be prefetched all the way into instruction cache 112 for primary processor 102.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for prefetching instructions by using an assist processor to perform prefetch operations in advance of a primary processor, comprising:

executing executable code on the primary processor;

simultaneously executing a reduced version of the executable code on the assist processor, wherein the reduced version of the executable code executes more quickly than the executable code, and performs prefetch operations for the primary processor in advance of when the primary processor requires the instructions; and storing the prefetched instructions into a cache that is accessible by the primary processor so that the primary processor is able to access the prefetched instructions without having to retrieve the prefetched instructions from a main memory.

2. The method of claim 1, further comprising, prior to executing the executable code:

compiling source code into executable code for the primary processor;

profiling the executable code to create instruction traces for frequently referenced portions of the executable code;

producing the reduced version of the executable code for the assist processor by producing prefetch instructions to prefetch portions of the instruction traces into the cache that is accessible by the primary processor; and inserting communication instructions into the executable code for the primary processor and into the reduced version of the executable code for the assist processor to transfer progress information from the primary processor to the assist processor;

wherein the progress information triggers the assist processor to perform the prefetch operations.

3. The method of claim 2, wherein the process of compiling the source code and the process of producing the reduced version of the executable code are carried out by a compiler.

4. The method of claim 2, wherein if the progress information indicates to the assist processor that the assist processor has prefetched instructions down the wrong path, the reduced version of the executable code causes the assist processor to discontinue prefetching.

5. The method of claim 1, wherein the reduced version of the executable code is configured to:

read control flow history information from special-purpose hardware that records branch history information and call history information;

construct a predicted path through the executable code based on the control flow history information; and to perform prefetch operations down the predicted path in order to prefetch instructions for the primary processor.

6. The method of claim 1, wherein producing the reduced version of the executable code involves:

constructing a control flow graph for the executable code;

removing loops from the control flow graph;

removing executable code instructions unrelated to the control flow graph; and inserting the prefetch instructions into the reduced version of the executable code to prefetch instructions from the executable code for the primary processor.

7. The method of claim 1, wherein performing the prefetch operations involves prefetching cache blocks containing multiple instructions for the primary processor.

8. The method of claim 1, further comprising periodically sending the progress information from the primary processor to the assist processor through a one-way communication channel.

9. A computer-readable storage medium storing instructions that when executed by a computer cause the computer to perform a method for prefetching instructions by using an assist processor to perform prefetch operations in advance of a primary processor, comprising:

executing executable code on the primary processor;

simultaneously executing a reduced version of the executable code on the assist processor, wherein the reduced version of the executable code executes more quickly than the executable code, and performs prefetch operations for the primary processor in advance of when the primary processor requires the instructions; and storing the prefetched instructions into a cache that is accessible by the primary processor so that the primary processor is able to access the prefetched instructions without having to retrieve the prefetched instructions from a main memory.

10. The computer-readable storage medium of claim 9, wherein prior to executing the executable code, the method further comprises:

compiling source code into executable code for the primary processor;

profiling the executable code to create instruction traces for frequently referenced portions of the executable code;

producing the reduced version of the executable code for the assist processor by producing prefetch instructions to prefetch portions of the instruction traces into the cache that is accessible by the primary processor; and inserting communication instructions into the executable code for the primary processor and into the reduced version of the executable code for the assist processor to transfer progress information from the primary processor to the assist processor;

wherein the progress information triggers the assist processor to perform the prefetch operations.

11. The computer-readable storage medium of claim 10, wherein the process of compiling the source code and the process of producing the reduced version of the executable code are carried out by a compiler.

12. The computer-readable storage medium of claim 10, wherein if the progress information indicates to the assist processor that the assist processor has prefetched instructions down the wrong path, the reduced version of the executable code causes the assist processor to discontinue prefetching.

13. The computer-readable storage medium of claim 9, wherein the reduced version of the executable code is configured to:

read control flow history information from special-purpose hardware that records branch history information and call history information;

construct a predicted path through the executable code based on the control flow history information; and to perform prefetch operations down the predicted path in order to prefetch instructions for the primary processor.

14. The computer-readable storage medium of claim 9, wherein producing the reduced version of the executable code involves:

constructing a control flow graph for the executable code;

removing loops from the control flow graph;

removing executable code instructions unrelated to the control flow graph; and inserting the prefetch instructions into the reduced version of the executable code to prefetch instructions from the executable code for the primary processor.

15. The computer-readable storage medium of claim 9, wherein performing the prefetch operations involves prefetching cache blocks containing multiple instructions for the primary processor.

16. The computer-readable storage medium of claim 9, wherein the method further comprises periodically sending the progress information from the primary processor to the assist processor through a one-way communication channel.

17. An apparatus that facilitates prefetching from memory, comprising:

a primary processor that is configured to execute executable code;

an assist processor that is configured to simultaneously execute a reduced version of the executable code, wherein the reduced version of the executable code executes more quickly than the executable code, and performs prefetch operations for the primary processor in advance of when the primary processor requires the instructions; and a cache that is accessible by the primary processor and is configured to store the prefetched instructions so that the primary processor is able to access the prefetched instructions without having to retrieve the prefetched instructions from a main memory.

18. The apparatus of claim 17, further comprising a compilation mechanism that is configured to:

compile source code into executable code for the primary processor;

profile the executable code to create instruction traces for frequently referenced portions of the executable code;

produce the reduced version of the executable code for the assist processor by producing prefetch instructions to prefetch portions of the instruction traces into the cache that is accessible by the primary processor; and to insert communication instructions into the executable code for the primary processor and into the reduced version of the executable code for the assist processor to transfer progress information from the primary processor to the assist processor;

wherein the progress information triggers the assist processor to perform the prefetch operations.

19. The apparatus of claim 18, wherein if the progress information indicates to the assist processor that the assist processor has prefetched instructions down the wrong path, the reduced version of the executable code causes the assist processor to discontinue prefetching.

20. The apparatus of claim 17, further comprising special-purpose hardware that records branch history information and call history information for the executable code, and wherein the reduced version of the executable code is configured to:

read control flow history information from special-purpose hardware that records branch history information and call history information;

construct a predicted path through the executable code based on the control flow history information; and to perform prefetch operations down the predicted path in order to prefetch instructions for the primary processor.

21. The apparatus of claim 17, wherein in producing the reduced version of the executable code, the compilation mechanism is configured to:

construct a control flow graph for the executable code;

remove loops from the control flow graph;

remove executable code instructions unrelated to the control flow graph; and to insert the prefetch instructions into the reduced version of the executable code to prefetch instructions from the executable code for the primary processor.

22. The apparatus of claim 17, wherein the prefetch operations are configured to prefetch cache blocks containing multiple instructions for the primary processor.

23. The apparatus of claim 17, wherein the primary processor and the assist processor reside on the same semiconductor chip.

24. The apparatus of claim 17, wherein the primary processor and the assist processor reside on distinct semiconductor chips.

25. The apparatus of claim 17, wherein the assist processor is a simplified version of the primary processor without hardware that is unrelated to memory access operations.

* * * * *